(12) United States Patent
Tran et al.

(10) Patent No.: US 10,291,348 B2
(45) Date of Patent: May 14, 2019

(54) SYSTEMS AND METHODS FOR CONTROL OF DRONES

(71) Applicant: Bao Tran, Saratoga, CA (US)

(72) Inventors: Bao Tran, Saratoga, CA (US); Ha Tran, Saratoga, CA (US)

( * ) Notice: Subject to any disclaimer, the term of this patent is extended or adjusted under 35 U.S.C. 154(b) by 41 days.

(21) Appl. No.: 15/795,195

(22) Filed: Oct. 26, 2017

(65) Prior Publication Data
US 2018/0069650 A1 Mar. 8, 2018

Related U.S. Application Data

(63) Continuation of application No. 15/013,589, filed on Feb. 2, 2016, now Pat. No. 9,835,709.

(51) Int. Cl.
| | | |
|---|---|---|
| H04K 3/00 | (2006.01) | |
| B64C 39/02 | (2006.01) | |
| G05D 1/00 | (2006.01) | |
| G01S 1/68 | (2006.01) | |
| G01S 1/70 | (2006.01) | |
| H04W 12/02 | (2009.01) | |

(52) U.S. Cl.
CPC ............. *H04K 3/45* (2013.01); *B64C 39/024* (2013.01); *G01S 1/68* (2013.01); *G01S 1/70* (2013.01); *G05D 1/0011* (2013.01); *H04K 3/822* (2013.01); *H04K 3/825* (2013.01); *H04K 3/90* (2013.01); *H04K 3/92* (2013.01); *H04W 12/02* (2013.01); *B64C 2201/027* (2013.01); *B64C 2201/128* (2013.01); *B64C 2201/14* (2013.01)

(58) Field of Classification Search
CPC ........... B64C 39/024; G01S 1/68; G01S 1/70; H04K 3/90
USPC .................................................. 244/12.3, 234
See application file for complete search history.

(56) References Cited

U.S. PATENT DOCUMENTS

| | | | |
|---|---|---|---|
| 5,486,819 A | 1/1996 | Horie | |
| 6,032,097 A | 2/2000 | Iihoshi | |
| 7,345,699 B2 | 3/2008 | Jannsen | |
| 7,782,256 B2 * | 8/2010 | Smith | ....................... G01S 5/06 |
| | | | 342/453 |
| 8,311,274 B2 | 11/2012 | Bergmann | |
| 8,655,537 B2 | 2/2014 | Ferguson | |
| 8,700,251 B1 | 4/2014 | Zhu | |
| 8,700,297 B2 | 4/2014 | Matsumura | |
| 9,244,147 B1 | 1/2016 | Soundararajan | |
| 9,412,278 B1 * | 8/2016 | Gong | ..................... H04L 63/101 |
| 9,689,976 B2 * | 6/2017 | Parker | ..................... G01S 13/06 |
| 9,742,737 B2 * | 8/2017 | Steiner | ................ H04L 63/0428 |
| 2004/0022416 A1 | 2/2004 | Lemelson | |
| 2006/0089964 A1 * | 4/2006 | Pandey | ............... H04W 40/246 |
| | | | 709/203 |

(Continued)

OTHER PUBLICATIONS

How to diy a Drones Jammer, http://ctstechnologys.com/how-to-diy-a-drones-jammer.html, Sep. 13, 2015.

(Continued)

*Primary Examiner* — Christopher P Ellis
(74) *Attorney, Agent, or Firm* — Tran & Associates

(57) ABSTRACT

A system includes a disabling device with a radio circuit configured to disrupt communication having a predetermined protocol; and a movable device including a radio circuit to receive the communication, wherein the radio circuit sends the protocol to disable the movable device.

18 Claims, 9 Drawing Sheets

(56) References Cited

U.S. PATENT DOCUMENTS

| | | | |
|---|---|---|---|
| 2008/0120025 A1 | 5/2008 | Naitou | |
| 2008/0248813 A1* | 10/2008 | Chatterjee | G01S 1/68 455/456.2 |
| 2012/0083959 A1 | 4/2012 | Dolgov | |
| 2012/0083960 A1 | 4/2012 | Zhu | |
| 2013/0002470 A1 | 1/2013 | Kambe | |
| 2013/0065615 A1* | 3/2013 | Jeong | H04W 64/00 455/456.6 |
| 2013/0182077 A1 | 7/2013 | Holz | |
| 2013/0261871 A1 | 10/2013 | Hobbs | |
| 2013/0343198 A1 | 12/2013 | Chhabra | |
| 2014/0018995 A1 | 1/2014 | Ferguson | |
| 2014/0206279 A1* | 7/2014 | Immendorf | H04K 3/40 455/1 |
| 2014/0214255 A1 | 7/2014 | Dolgov | |
| 2014/0278055 A1 | 9/2014 | Wang | |
| 2014/0278074 A1 | 9/2014 | Annapureddy | |
| 2015/0302858 A1 | 10/2015 | Hearing | |
| 2016/0047915 A1* | 2/2016 | Raasakka | G01S 19/21 342/357.59 |
| 2016/0119770 A1* | 4/2016 | Ryu | H04W 8/005 370/328 |
| 2016/0150361 A1* | 5/2016 | Zhu | G01S 19/14 455/456.1 |
| 2016/0192136 A1* | 6/2016 | Pan | H04W 12/06 455/456.1 |
| 2016/0253533 A1* | 9/2016 | Bhargava | G01S 5/0215 340/10.1 |
| 2016/0334494 A1* | 11/2016 | Yamauchi | G01S 5/02 |
| 2017/0085415 A1* | 3/2017 | Ameixiera | H04W 56/0025 |
| 2017/0092138 A1* | 3/2017 | Trundle | B64C 39/024 |
| 2017/0183096 A1* | 6/2017 | Meinhart | B64C 39/024 |
| 2017/0192089 A1* | 7/2017 | Parker | G01S 3/782 |
| 2017/0261613 A1* | 9/2017 | Van Voorst | G01S 7/51 |

OTHER PUBLICATIONS

Gupta et al, Information Embedding in IEEE 802.11 Beacon Frame, 2012, National Conference on Communication Technologies & its impact on Next Generation Computing CTNGC 2012.

* cited by examiner

100

| |
|---|
| Package assigned for delivery with permission code (155) |
| User computing device time of delivery and delivery path (157) |
| Load package on the delivery vehicle (159) |
| Transport package to destination (161) |
| Request permission to land using permission code (163) |
| Detect user computing device granting permission (165) |
| Deposit package using delivery vehicle (167) |
| Delivery receptable transports package to secure location (169) |

FIG. 1C

| |
|---|
| Receive start and destination coordinates (181) |
| Retrieve NoFlyZone coordinates blocking travel and use public road segments as substitutes for flying over the NoFlyZone coordinates (183) |
| During flight, query beacon frames of local stations that require fly over permission (185) |
| Negotiate permission and if granted, continue path (187) |
| If permission denied, reroute path to use public road segment as substitutes for flying over beacons that do not consent to fly over (189) |
| Record permission history and path in database to optimize future flights (190) |

FIG. 1D

| Identify drone and distance to property by audio-visual or RF identification (196) |
|---|
| If drone violates privacy, aim directional antenna at drone and deliver highly targeted beam to disable drone (196) |

Beacon Frame 200

| SA 210 | DA 215 | BSSID 220 | Timestamp 225 | Beacon Interval 230 |

| Capability Information 235 | SSID 240 | Supported Rates 245 | FH Parameter Set 250 | TIM 255 |

FIG. 2

SYSTEMS AND METHODS FOR CONTROL OF DRONES

The present invention relates to privacy protection from robots such as drones, cars, and AV recording equipment.

Drones are capable highly advanced surveillance, and drones already in use by law enforcement can carry various types of equipment including live-feed video cameras, infrared cameras, heat sensors, and radar. Some military versions can stay in air the hours for hours or days at a time, and their high-tech cameras can scan entire cities, or alternatively, zoom in and read a milk carton from 60,000 feet. They can also carry wifi crackers and fake cell phone towers that can determine your location or intercept your texts and phone calls. Drone manufacturers even admit they are made to carry "less lethal" weapons such as tasers or rubber bullets.

In a parallel trend, smart cars and robots now can perform automated navigation to get to a predetermined destination. These vehicles can deliver goods, take pictures and perform surveillance functions.

Privacy law has not kept up with the rapid pace of drone technology, and police may believe they can use drones to spy on citizens with no warrant or legal process whatsoever. In the absence of clear laws governing drones and privacy, some individuals have taken matters into their own hands, including a Kentucky man who is facing charges after shooting down a drone hovering over his property. Jammers are also available, but illegal for use in many jurisdiction except for non-governmental employees.

The use of drones and robots over private property has drawn attention from lawmakers, industry advocates and everyday citizens who are grappling with issues of privacy and safety while balancing the potential benefit from commercial or private uses of drones, robotics, and smart vehicle technology.

SUMMARY

In one aspect, a system to provide privacy from third party vehicles includes a radio circuit configured to send a privacy indication in a beacon frame; and a movable device including a radio circuit to receive the beacon frame and a motor actuator controlled to comply with the privacy indication.

In another aspect, a system to deliver packages in specified locations, comprising: a storage device associated with a delivery device; and a processor communicatively coupled to the delivery device storage device, wherein the processor executes application code instructions that are stored in the storage device to cause the system to: receive, from a package delivery computing system, delivery information associated with a package, the delivery information comprising a delivery address location and privacy authentication information to land the delivery device at that delivery address location; transport the package to the delivery address; detect one or more first beacons being transmitted by a delivery receptacle at the delivery address; navigate toward the delivery receptacle based on the detected one or more first beacons; transmit a second beacon to the delivery receptacle, the second beacon providing a basis for the delivery receptacle to adjust a direction of the one or more first beacons during navigation of the delivery device toward the delivery receptacle; and deposit the package into the delivery receptacle, and a delivery receptacle storage device; and a processor communicatively coupled to the delivery receptacle storage device, wherein the processor executes application code instructions that are stored in the delivery receptacle storage device to cause the system to: receive a communication that the delivery device is transporting the package to the delivery receptacle; transmit the one or more first beacons in an expected direction of arrival of the delivery device; receive the second beacon from the delivery device; determine a relative position of the delivery device with respect to the delivery receptacle based on the second beacon; adjust the transmission direction of the one or more first beacons based on the relative position of the delivery device with respect to the delivery receptacle wherein the direction of the one or more first beacons is adjusted by a mechanical device; and receive the package from the delivery device.

In another aspect, a delivery process that respects privacy requests includes code to identify drone and distance to property by audio-visual or RF identification and if drone violates privacy, aim directional antenna at drone and deliver highly targeted beam to disable drone.

In yet another aspect, to enforce the privacy restrictions, a system can track incoming vehicles and determine if they are trespassing. This can be done using radar circuit, optical/sound recognition, or RF circuit identification. Upon confirmation of trespass, jammers which can be laser/light based jamming can be turned on to prevent video recording. Jammers can also be RF based to disorient the drone in one implementation.

BRIEF DESCRIPTION OF THE DRAWINGS

In the drawings, like reference numbers generally indicate identical or similar elements. Additionally, generally, the left-most digit(s) of a reference number identifies the drawing in which the reference number first appears.

Embodiments are described, by way of example only, with reference to the accompanying drawings. Further, the accompanying drawings, which are incorporated herein and form part of the specification, illustrate the embodiments of the present disclosure and, together with the description, further serve to explain the principles of the disclosure and to enable a person skilled in the relevant art(s) to make and use embodiments thereof.

FIG. 1C is a block diagram depicting a method for an aerial delivery device to deliver a package, in accordance with certain example embodiments.

FIG. 1D shows an exemplary drone path planning process that takes into consideration permission transmission from properties that drone may impact.

FIG. 2 is a block diagram illustrating one embodiment of a beacon frame.

Figure 1A:
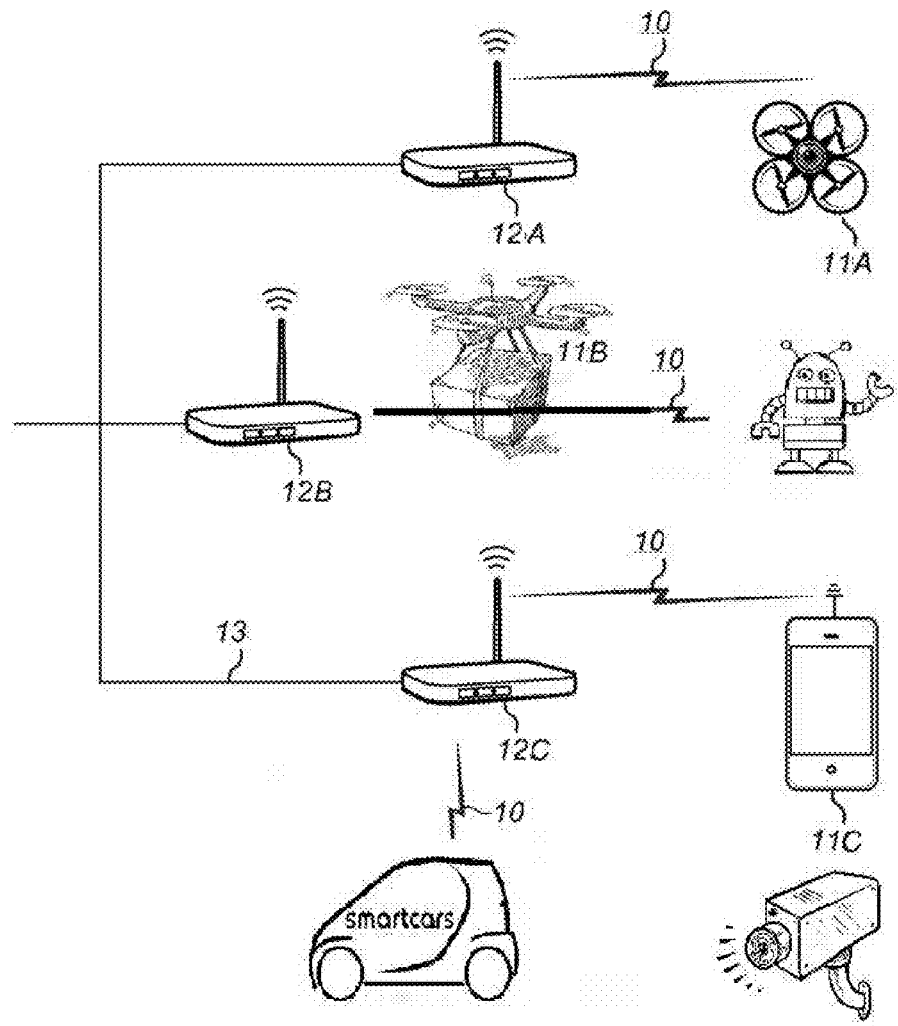
FIG. 1A is a block diagram illustrating one embodiment of a network supporting wireless communication.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure. References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

"Comprising." This term is open-ended. As used in the appended claims, this term does not foreclose additional structure or steps. Consider a claim that recites: "An apparatus comprising a radio circuit . . . ." Such a claim does not foreclose the apparatus from including additional components (e.g., a central processing unit, graphics circuitry, peripherals, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Computer readable medium." As used herein, this term refers to an article of manufacture and may include any non-transitory/tangible storage media readable by a device to provide instructions and/or data to the device. For example, a computer readable storage medium may include storage media such as magnetic or optical media, e.g., disk (fixed or removable), tape, CD-ROM, DVD, etc. Storage media may further include volatile or non-volatile memory media such as RAM, ROM, Flash memory, etc.

DETAILED DESCRIPTION

Provided herein are system, method and/or computer program product embodiments, and/or combinations and sub-combinations thereof, for detecting timing anomalies within systems, such as but not limited to digital systems.

While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to effect such feature, structure, or characteristic in connection with other embodiments whether or not explicitly described.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

Turning now to FIG. 1A, a block diagram of a network is depicted. Network is one embodiment of a network that is configured to support wireless communication between network components. In the illustrated embodiment, the network includes wireless devices such as unauthorized drones 11A, authorized drone 11B and wireless device phone 11B, wireless access points 12A-C, and a wired network 13.

Wireless devices 11 may be any type of suitable device that communicate over wireless networks. Devices 11 may be airborne drones, road-driven drones, smart cars, robots, cameras with audio recording capabilities, moving or stationary vehicles with surveillance capabilities such as cameras/microphones, or moveable platforms in general. Devices 11 may also, for example, include desktop personal computers, laptops, workstations, net tops, mobile phones, personal data assistants, tablet devices, music players, I/O devices such as monitors, televisions, touch screens, digital cameras, scanners, video recorders, video players, etc. In some embodiments, wireless devices 11 are configured to implement one or more of the IEEE 802.11 standards (such as 802.11a, b, g, n, k, and ac) in order to establish a wireless connection 10 with an access point 12. In some embodiments, wireless devices may support other wireless standards such as IEEE 802.15 standards (e.g., Bluetooth, ZigBee, etc.), cellular standards (e.g., Universal Mobile Telecommunications System (UMTS), Evolution-Data Optimized (EV-DO), Long Term Evolution (LTE), etc.), etc.

Access points 12, in one embodiment, are configured to facilitate communication between wireless devices 11 and wired network 13. Accordingly, access points 12 may be configured to communicate over one or more wireless channels corresponding to different respective frequencies (e.g., channels associated with 2.4 GHz and 5 GHz bands. Access points 12 may also support multiple transmission rates, various encryption standards, frequency hopping, etc.

In some embodiments, access points 12 are members of the same extended service set (ESS); in one embodiment, access points 12 are associated with the same service set identifier (SSID). Although, in the illustrated embodiment, access points 12 are shown as being coupled to the same wired network 13, in some embodiments, access points 12 may be associated with separate unrelated networks.

Wired network 13 may correspond to any suitable wired network. Accordingly, in one embodiment, network 13 is a local area network (LAN). Network 13 may include switches, routers, or other wired devices. In some embodiments, network 13 may include one or more gateways to facilitate communication with a wide area network (WAN) such as the Internet.

In various embodiments, access points 12 are configured to transmit beacon frames to wireless devices 11 to facilitate communication with devices. Access points 12 may transmit beacon frames as part of a periodic broadcast such as transmitting a beacon frame every 100 ms. A wireless device 11 may thus receive the beacon frame by monitoring the wireless channel that the beacon frame is transmitted over. Access points 12 may also transmit a probe response (which is a frame that has a similar layout as a beacon frame and specifies similar information such as a beacon interval and a timestamp discussed below) in response to receiving a probe request from a given wireless 11. For example, wireless device 11A may send a probe request to access point 12A to request a probe response from that access point 12; wireless device 11A may then monitor the wireless channel associated with access point 12A for the probe response.

Figure 1B:
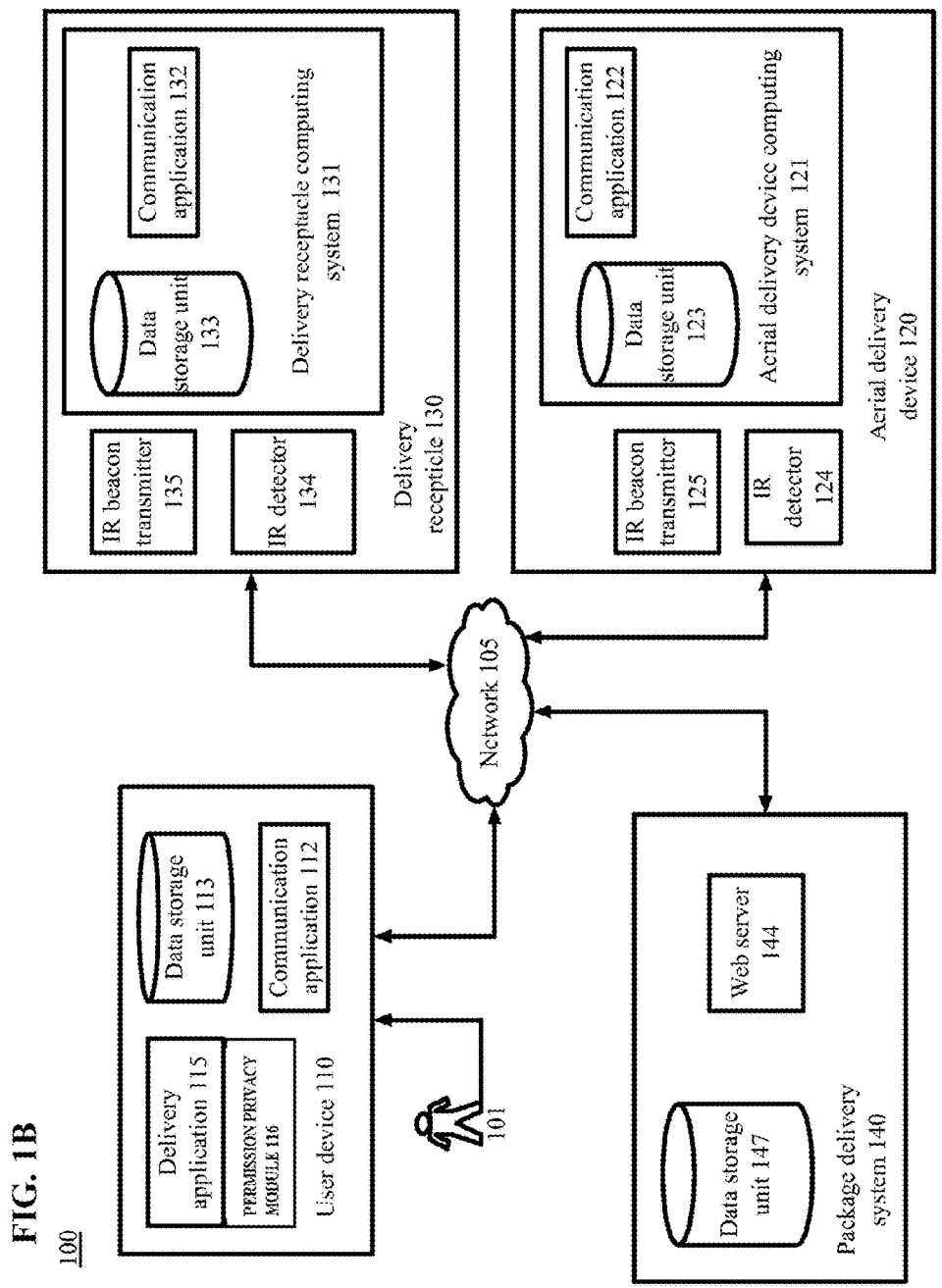
FIG. 1B is a block diagram depicting a system 100 for an aerial delivery device 120 to deliver a package, in accordance with certain example embodiments.

FIG. 1B is a block diagram depicting a system 100 for an aerial delivery device 120 to deliver a package, in accordance with certain example embodiments. As depicted in FIG. 1B, the system 100 includes network computing devices 110, 120, 130, and 140 that are configured to communicate with one another via one or more networks 105. In some embodiments, a user associated with a device must install an application and/or make a feature selection to obtain the benefits of the techniques described herein. The network 105 can include a local area network ("LAN"), a wide area network ("WAN"), an intranet, an Internet, storage area network ("SAN"), personal area network ("PAN"), a metropolitan area network ("MAN"), a wireless local area network ("WLAN"), a virtual private network ("VPN"), a cellular or other mobile communication network, Bluetooth, NFC, or any combination thereof or any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

Each network computing device 110, 120, 130, and 140 includes a device having a communication module capable of transmitting and receiving data over the network 105. For example, each network computing device 110, 120, 130, and 140 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the network computing devices 110, 120, 130, and 140 may be operated or configured by users 101, aerial delivery device operators, users 101, and package delivery system operators, respectively.

An example user computing device 110 comprises a data storage unit 113, a delivery application 115, a permission privacy module 116, and a communication application 112. In an example embodiment, a user interface enables the user 101 to interact with the delivery application 115 and/or the communication application 112. For example, the user interface may be a touch screen, a voice-based interface or any other interface that allows the user 101 to provide input and receive output from an application or module on the user computing device 110.

In an example embodiment, the data storage unit 113 comprises a local or remote data storage structure accessible to the user computing device 110 suitable for storing information. In an example embodiment, the data storage unit 113 stores encrypted information, such as HTML5 local storage.

In an example embodiment, the user 101 can use a communication application 112, such as a web browser application or a delivery application 115, to view, download, upload, or otherwise access documents or web pages via a distributed network 105.

In an example embodiment, the delivery application 115 is a program, function, routine, applet, or similar entity that exists on and performs operations on the user computing device 110. In certain embodiments, the user 101 must install the delivery application 115 and/or make a feature selection on the user computing device 110 to obtain the benefits of the techniques described herein. In an example embodiment, the user 101 may access the delivery application 115 on the user computing device 110 via a user interface. In an example embodiment, a user 101 signs in to the delivery application 115, which enables the user 101 to interact with the delivery receptacle 130, the package delivery system 140, a merchant system, or other system to arrange, alter, or cancel the delivery of a product. The delivery application 115 may be used to exchange data with the delivery receptacle 130. For example, the delivery application may provide instructions to the delivery receptacle 130 for receiving a product from the aerial delivery device 120. Although the device 120 is a drone in this example, it can be a smart vehicle or a robot or a computer controlled vehicle.

An example package delivery system 140 comprises a web server 144 and a data storage unit 147. In an example embodiment, the package delivery system 140 communicates with the user device 110, merchant systems, other package delivery systems, or any other person, group, or system that delivers or receives packages. In an example embodiment, user device 110 has a delivery application 115 distributed by the package delivery system 140 that enables the user 101 to access an account or information about a package. In another example embodiment, the user 101 accesses an account via the communication application 112 of the user device 110. In an example embodiment, when the user 101 accesses his account via the delivery application 115 or communication application 112, the web server 144 logs user device 110 location data.

The package delivery system 140 may represent any system that delivers or receives packages. For example, the package delivery system 140 may be a courier, a merchant system, a retailer, a shipping company, a postal service, or any suitable system.

The aerial delivery device 120 may be a drone, smart car, or other unmanned vehicle. The aerial delivery device 120 may be helicopter, quadcopter, or other aerial delivery device. In alternative embodiments, a device other than an aerial delivery device can be utilized, which does not deliver packages via flight. For example, a wheeled vehicle or other vehicle that delivers packages without flight may be used.

In an example, the non-flying delivery device may utilize wheels, articulated legs, or any suitable means for propulsion. The non-flying delivery device may drive to a location, recognize the IR beacon, and proceed to the delivery receptacle 130 by rolling, walking, or via any suitable propulsion. The non-flying delivery device may deposit the package via an articulated arm, a conveyor belt, or any other suitable mechanisms.

The aerial delivery device 120 employs an aerial delivery device computing system 121. The aerial delivery device 120 computing system 121 comprises the hardware, software, and other devices for communication, navigation, image capturing, image processing, and any other suitable computerized or automated functions.

The aerial delivery device computing system 121 comprises a communication application 122 and a data storage unit 123. The aerial delivery device computing system 121 may utilize a communication application 122 to receive instructions for package deliveries. For example, the aerial delivery device computing system 121 may receive, via the communication application 122, delivery addresses, GPS locations, package details, or other delivery information. The aerial delivery device computing system 121 may utilize the data storage unit 123 for storing the information received via the communication application, and other suitable data.

The aerial delivery device 120 comprises an IR detector 124. The IR detector 124 of the aerial delivery device 120 may be any detector that captures infrared beacons or any other beacon. For example, the IR detector 124 may alternatively detect laser guidance beacons, BLUETOOTH signals, Wi-Fi, or any other suitable beacon, communication, signal, or transmission. The aerial delivery device computing system 121 analyzes received IR beacons or other signals to identify a location of the delivery receptacle 130. The aerial delivery device computing system 121 determines a location of the delivery receptacle 130 based on the analysis and navigates to the delivery receptacle 130.

The aerial delivery device 120 comprises an IR beacon transmitter 125. The IR beacon transmitter 125 may represent any beacon, signal or other transmission that is broadcast to the delivery receptacle 130. The IR beacon transmitter 125 may broadcast the IR signal or other signal to the delivery receptacle 130 to allow the delivery receptacle 130 to more accurately direct the IR beacon transmitter 135. In example embodiments, the IR beacon transmitter 125 may alternatively be a laser guidance beacon, BLUETOOTH signal, Wi-Fi signal, or any other suitable beacon, communication, signal, or transmission. Some functions described as being performed by one of the IR beacon transmitter 125, the IR detector 124, or the communication application 122 may alternatively be performed by one or more of the others applications or modules.

The aerial delivery device computing system 121 may also comprise a navigation system, such as a global positioning system ("GPS") or other navigation system. For example, the aerial delivery device computing system 121 may have a mapping system stored in the data storage unit 123 that works alone or in conjunction with onboard GPS technology to assist the aerial delivery device computing system 121 with navigation.

The delivery receptacle 130 may be a box or other container or vessel that is capable of receiving a package. The delivery receptacle 130 may be in the shape of a cube, a cylinder, or any other suitable shape. The delivery receptacle 130 may be equipped with a hatch, bay, door, or other opening that allows a package to be placed inside. The door may be spring actuated, or actuated by any other mechanical or electrical means, to allow the door to return to a closed position after the package is delivered.

The delivery receptacle 130 may be equipped with a system to allow the delivery receptacle 130 to move to a package receiving area and back to a secure location. In an example, the delivery receptacle 130 may utilize wheels, rotors for flying, articulated legs, or any suitable means for propulsion or locomotion. The delivery receptacle 130 may proceed to a desired location by rolling, walking, flying, or via any suitable propulsion.

The delivery receptacle 130 employs a delivery receptacle computing system 131. The delivery receptacle computing system 131 comprises the hardware, software, and other devices for communications, navigations, IR transmitting and receiving, and any other suitable computerized or automated functions.

The delivery receptacle computing system 131 comprises a communication application 132 and a data storage unit 133. The delivery receptacle computing system 131 may utilize a communication application 132 to receive data related to package deliveries. For example, the delivery receptacle computing system 131 may receive, via the communication application 132, delivery times, arrival directions, package details, safe receiving areas, or other delivery information. The delivery receptacle computing system 131 may use the communication application 132 to communicate with the user computing device 110. For example, the delivery receptacle computing system 131 may communicate that a package has been delivered. The delivery receptacle computing system 131 may utilize the data storage unit 133 for storing the information received via the communication application, and other suitable data.

The delivery receptacle 130 may comprise an IR detector 134. The IR detector 134 may be any detector that captures infrared beacons or any other beacon. For example, the IR detector 134 may detect laser guidance beacons, BLUETOOTH signals, Wi-Fi, or any other suitable beacon, communication, signal, or transmission. The delivery receptacle computing system 131 analyzes IR beacons to identify a location of the aerial delivery device 130. The aerial delivery device computing system 121 determines a location of delivery receptacle 130 based on the analysis and navigates to the delivery receptacle 130.

The delivery receptacle 130 comprises an IR beacon transmitter 135. The IR beacon transmitter 135 may represent any beacon, signal or other transmission that is broadcast to the aerial delivery device 120. The IR beacon transmitter 135 may broadcast the IR signal or other signal to the aerial delivery device 120 to allow the aerial delivery device 120 to be guided into a position to deposit a package. In example embodiments, the IR beacon transmitter 135 may alternatively be a laser guidance beacon, BLUETOOTH signal, Wi-Fi signal, or any other suitable beacon, communication, signal, or transmission.

The delivery receptacle 130 may utilize a particular configuration of IR beacon transmitters 135 to allow the aerial delivery device 120 to triangulate a relative position. In an example, the IR beacon transmitters 135 are located on four corners of the top surface of the delivery receptacle 130. Additionally, the IR beacon transmitters 135 may be mounted to a movable device that can be used to change the direction of the transmission of the IR beacon transmitter 135. For example, the IR beacon transmitters 135 may be mechanically rotated to provide a 360 degree broadcast range. That is, when the direction of an aerial delivery device 120 is identified, the IR beacon transmitters 135 may be rotated to a position such that the IR beacon transmitter 135 is transmitting in a direction in which the aerial delivery device 120 is located. In an example, the movable device is a motorized mechanism that may be directed by the delivery receptacle computing system 131. In certain embodiments, the delivery receptacle computing system 131 utilizes a compass or other direction determining device to determine an aiming configuration.

Some functions described as being performed by one of the IR beacon transmitters 135, the IR detector 134, or the communication application 132 may alternatively be performed by one or more of the others applications or modules.

The delivery receptacle computing system 131 may also comprise a navigation system, such as a global positioning system ("GPS") or other navigation system. For example, the delivery receptacle computing system 131 may have a mapping system stored in the data storage unit 123 that works alone or in conjunction with onboard GPS technology to assist the delivery receptacle computing system 131 with navigation. The delivery receptacle 130 may use the navigation system to position the delivery receptacle 130 for receiving a package, for moving a package to a safe location, or for any suitable reason.

It will be appreciated that the network connections shown are example and other means of establishing a communications link between the computers and devices can be used. Additionally, those having ordinary skill in the art having the benefit of the present disclosure will appreciate that the user computing device 110, the aerial delivery device 120, the delivery receptacle 130, and the package delivery system 140 illustrated in FIG. 1 can have any of several other suitable computer system configurations. For example, a user computing device 110 embodied as a mobile phone or handheld computer, or an aerial delivery device, may or may not include all the components described above.

The package delivery system 140 may be any system, company, organization, government service, or individual that delivers packages from one location to another. For example, the package delivery system 140 may be a courier, postal service, package delivery company, a merchant system, a retailer, or any other suitable system that delivers packages. The package for delivery arrives at the package delivery system 140 with appropriate paperwork for delivery to a user 101. The paperwork may be digital, a barcode or other machine-readable code, a sticker, or any suitable paperwork. The paperwork may contain a user 101 name, a user address, a confirmation number, a sender name and address, and other identifying information for the recipient, sender, origin location, and/or delivery location 104.

In example embodiments, the network computing devices and any other computing machines associated with the technology presented herein may be any type of computing machine such as, but not limited to, those discussed in more detail with respect to FIG. 8. Furthermore, any modules associated with any of these computing machines, such as modules described herein or any other modules (scripts, web content, software, firmware, or hardware) associated with the technology presented herein may by any of the modules discussed in more detail with respect to FIG. 8. The computing machines discussed herein may communicate with one another as well as other computer machines or communication systems over one or more networks, such as network 105. The network 105 may include any type of data or communications network.

FIG. 1C is a block diagram depicting a method for an aerial delivery device to deliver a package, in accordance with certain example embodiments. The method 200 is described with reference to the components illustrated in FIG. 1A-1B. The item is ordered, along with payment and a security code to enter the premises of the ordering person. Next, the package is assigned for delivery with permission code (155), and the user computing device is sent time of delivery and delivery path (157). The package is loaded on the delivery vehicle (159). The vehicle transports the package to destination (161). Upon arrival, the vehicle request permission to land using permission code (163). The user computing device grants permission, and the vehicle detects user computing device granting permission (165). Alternatively, with the code, the system can direct enter the premise without being disrupted. The package is deposited using delivery vehicle (167). If a delivery receptacle is provided for security or for ease of syncing with the delivery vehicle, the delivery receptable then transports package to secure location (169).

The delivery information may be provided by the sender of the package or by the user 101. For example, the sender or the user 101 may enter the delivery information into a website of the package delivery system 140. In another example, the sender or the user 101 may enter the delivery information into a delivery application 115 or in any suitable manner input delivery instructions that are communicated to the package delivery system 140. Then a security access code is provided to permit the vehicle to enter the property for delivery purposes. A destination address is associated with the package. For example, the package delivery system 140 obtains the delivery address from the paperwork or digital information associated with the package. The delivery address is stored with identification of the package in the package delivery system 140. The package delivery system 140 associates the package with an aerial delivery device computing system 121. The package delivery system 140 may identify an aerial delivery device 120 that is associated with a delivery area in which the delivery address is located. For example, certain aerial delivery devices 120 may be assigned a delivery route that encompasses a particular geographic region. If the delivery address is located in that geographic region, then the package may be associated with that particular aerial delivery device 120. In an alternate embodiment, the package is associated with the aerial delivery device 120 that is next in a queue of aerial delivery devices 120.

The instructions for delivery of the package are provided to the aerial delivery device computing system 121. In an example embodiment, the instructions are delivered to the communication application 122 of the aerial delivery device computing system 121 via near field communication, Bluetooth, Wi-Fi, or any available communication. The instructions may be transmitted to the aerial delivery device computing system 121 by a computing system associated with the package delivery system 140. For example, an operator of the package delivery system 140 may direct a computing system to deliver the instructions, or the operator may enter the instructions directly into a user interface of the aerial delivery device computing system 121. Any suitable manner of transmitting the instructions to the aerial delivery device computing system 121 may be used.

For example, the package delivery system 140 provides to the aerial delivery device computing system 121 an entry authorization code and an address for a user residence or a GPS location to the aerial delivery device. Additionally, the aerial delivery device computing system 121 is provided with the infrared ("IR") beacon or other signaling technology that is associated with the delivery receptacle 130 to which the package should be delivered. Any suitable instructions that will allow the aerial delivery device to locate the delivery location 104 may be used. The user 101 is provided a time to expect the delivery. The delivery time may be transmitted to the user computing device 110 by the package delivery system 140, a merchant system, or other entity. The user computing device 110 may store the expected delivery time or communicate the expected delivery time to the delivery receptacle 130 or another computing device. The user computing device 110 may display the expected delivery time to the user 101 via the user interface of the user computing device 110. Alternatively, the time to expect the delivery is provided directly to the delivery receptacle computing system 131. For example, the delivery time may be transmitted to the delivery receptacle computing system 131 via cellular or other wireless technology. The delivery time may be transmitted to the user computing device 110 by the package delivery system 140, a merchant system, or other entity. The user computing device 110 may store the expected arrival direction or communicate the expected arrival direction to the delivery receptacle 130 or another computing device. The user computing device 110 may display the expected arrival direction to the user 101 via the user interface of the user computing device 110.

The package may be loaded in in any suitable manner that allows the aerial delivery device 120 to transport the package to the delivery location. For example, the aerial delivery device 120 may be equipped with a platform for supporting the package during transit. In another example, the aerial delivery device 120 may support the package with a strap, a hook, an attached net, a winch, or with any suitable attachment device. The package maybe loaded with an automated packaging process. Alternatively, the package maybe loaded manually by an operator at the package delivery system 140. The aerial delivery device computing system 121 may receive a digital confirmation of the package's identification from an operator or a computing system of the package delivery system 140.

The aerial delivery device 120 transports the package to the address associated with the delivery destination. The aerial delivery device 120 may proceed to the address associated with the user 101. For example the aerial delivery device 120 may fly to the address via a predetermined route. In an example embodiment, the aerial delivery device computing system 121 may navigate via a mapping program to proceed to the address by following a route provided by the mapping program to reach the destination address of the user 101. In an alternative example embodiment, the aerial delivery device computing system 121 may navigate via a global positioning system ("GPS") technology to the destination address of the user 101. The aerial delivery device 120 may be transported a portion of the distance to the delivery address by a separate vehicle. For example, a delivery truck may deliver multiple aerial delivery devices 120 to within a location that is central to multiple delivery addresses. The aerial delivery device 120 then leaves the delivery truck and travels the remaining distance with the package.

In an example embodiment, the aerial delivery device 120 arrives at the address of the delivery location when the aerial delivery device 120 is on or above the street directly in front of the structure at the address. In another example, the aerial delivery device 120 hovers over the property located at the address. In an example, the aerial delivery device computing system 120 may confirm the arrival at the delivery address by comparing the appearance of the delivery address with a digital image of the digital address provided by the package delivery system 140 or other suitable provider.

FIG. 1D shows an exemplary drone path planning process that takes into consideration permission transmission from properties that drone may impact:

Receive start and destination coordinates (181)
Retrieve NoFlyZone coordinates blocking travel and use public road segments as substitutes for flying over the NoFlyZone coordinates (183)
During flight, query beacon frames of local stations that require fly over permission (185)
   Negotiate permission and if granted, continue path (187)
   If permission denied, reroute path to use public road segment as substitutes for flying over beacons that do not consent to fly over (189)
Record permission history and path in database to optimize future flights (190)

Thus, for households with requests for privacy, the system will use the public road/transit paths to avoid privacy restrictions, and when a direct path is possible, the system will take advantage of the access permissions to save energy.

Next a flock control behavior is detailed for vehicles traveling in a similar direction. In one embodiment, a plurality of vehicles follow a leader car, who in turn is following a target vehicle or a target driving plan. The leader, or the first vehicle in the group would automatically or manually take evasive actions to avoid an obstacle, and the information is transmitted via vehicle to vehicle communication such as DSRC to following vehicles, and the driving path of the entire flock is adjusted according to the obstacle. "Flocking" is the collective motion of a large number of self-propelled entities and is a collective animal behavior exhibited by many living beings such as birds, fish, bacteria, and insects. It is considered an emergent behavior arising from simple rules that are followed by individuals and does not involve any central coordination. The vehicle communications would identify vehicles traveling as a flock, and the vehicles perform distributed flocking operation by communication over the wireless network. One embodiment of the vehicle flocking process has the following structure:

```
initialise_vehicle_positions( )
LOOP
   place_vehicles( )
   move_all_vehicles_to_new_positions( )
END LOOP
```

Each of the vehicles rules works independently, so, for each vehicle, the process calculates how much it will get moved by each of the three rules, generating three velocity vectors. The three vectors to the vehicle's current velocity to work out its new velocity.

```
PROCEDURE move_all_vehicles_to_new_positions( )
   Vector v1, v2, v3
   Vehicle b
   FOR EACH VEHICLE b
      v1 = rule1(b)
```

-continued

```
    v2 = rule2(b)
    v3 = rule3(b)
    b.velocity = b.velocity + v1 + v2 + v3
    b.position = b.position + b.velocity
END
```

The Vehicles Rules are discussed next. One embodiment simulates simple agents (vehicles) that are allowed to move according to a set of basic rules. The result is akin to a flock of birds, a school of fish, or a swarm of insects. In one embodiment, flocking behavior for each vehicle is controlled by three rules:

Separation—avoid crowding neighbors (short range repulsion)

Alignment—steer towards average heading of neighbors

Cohesion—steer towards average position of neighbors (long range attraction)

Rule 1: Vehicles try to go towards the center of mass of neighboring vehicles. The 'center of mass' is simply the average position of all the vehicles. Assume there are N vehicles, called b1, b2, . . . , bN. Also, the position of a vehicle b is denoted b.position. Then the 'center of mass' c of all N vehicles is given by: c=(b1.position+b2.position+ . . . +bN.position)/N However, the 'center of mass' is a property of the entire flock of vehicles; it is not something that would be considered by an individual vehicle. Each vehicle is moved toward its 'perceived center', which is the center of all the other vehicles, not including itself. Thus, for vehicleJ ($1<=J<=N$), the perceived center pcJ is given by:

pcJ=(b1.position+b2.position+ . . . +bJ−1.position+bJ+1.position+ . . . +bN.position)/(N−1)

Having calculated the perceived center, the system moves the vehicle towards it. To move it 1% of the way towards the center this is given by (pcJ−bJ.position)/100 as:

```
PROCEDURE rule1(vehicle bJ)
    Vector pcJ
    FOR EACH VEHICLE b
        IF b != bJ THEN          pcJ = pcJ + b.position
    pcJ = pcJ / N-1
    RETURN (pcJ - bJ.position) / 100
```

Rule 2: Vehicles try to keep a small distance away from other objects (including other vehicles). The rule ensures vehicles don't collide into each other. If each vehicle within a defined small distance (say 100 units) of another vehicle, the vehicle is moved away. This is done by subtracting from a vector c the displacement of each vehicle which is near by.

```
PROCEDURE rule2(vehicle bJ)
    Vector c = 0;
    FOR EACH VEHICLE b
        IF b != bJ THEN
            IF |b.position - bJ.position| < 100 THEN   c = c - (b.position - bJ.position)
    RETURN c
```

If two vehicles are near each other, they will be slightly steered away from each other, and at the next time step if they are still near each other they will be pushed further apart. Hence, the resultant repulsion takes the form of a smooth acceleration. If two vehicles are very close to each other it's probably because they have been driving very quickly towards each other, considering that their previous motion has also been restrained by this rule. Suddenly jerking them away from each other is not comfortable for passengers and instead, the processes have them slow down and accelerate away from each other until they are far enough apart for our liking.

Rule 3: Vehicles try to match velocity with near vehicles.

This is similar to Rule 1, however instead of averaging the positions of the other vehicles we average the velocities. We calculate a 'perceived velocity', pvJ, then add a small portion (about an eighth) to the vehicle's current velocity.

```
PROCEDURE rule3(vehicle bJ)
    Vector pvJ
    FOR EACH VEHICLE b
        IF b != bJ THEN
            pvJ = pvJ + b.velocity
        END IF
    END
    pvJ = pvJ / N-1
    RETURN (pvJ - bJ.velocity) / 8
END PROCEDURE
```

Additional rules is implemented as a new procedure returning a vector to be added to a vehicle's velocity.

Action of a crowd or traffic is discussed next. For example, to handle strong traffic.

```
PROCEDURE strong_traffic(Vehicle b)
    Vector traffic
    RETURN traffic
END PROCEDURE
```

This function returns the same value independent of the vehicle being examined; hence the entire flock will have the same push due to the traffic or crowd.

Limiting the speed of vehicles is discussed next. For a limiting speed vlim:

```
PROCEDURE limit_velocity(Vehicle b)
    Integer vlim
    Vector v
    IF |b.velocity| >vlim THEN
        b.velocity = (b.velocity / |b.velocity|) * vlim
    END IF
END PROCEDURE
```

This procedure creates a unit vector by dividing b.velocity by its magnitude, then multiplies this unit vector by vlim. The resulting velocity vector has the same direction as the original velocity but with magnitude vlim.

The procedure operates directly on b.velocity, rather than returning an offset vector. It is not used like the other rules; rather, this procedure is called after all the other rules have been applied and before calculating the new position, ie. within the procedure move_all_vehicles_to_new_positions:

b.velocity=b.velocity+v1+v2+v3+ limit_velocity(b)

b.position=b.position+b.velocity

Bounding the position is discussed next. In order to keep the flock within a certain zone so that they can drive out of them, but then slowly turn back, avoiding any harsh motions.

```
PROCEDURE bound_position(Vehicle b)
    Integer Xmin, Xmax, Ymin, Ymax, Zmin, Zmax
```

-continued

```
Vector v
IF b.position.x < Xmin THEN v.x = 10
    ELSE IF b.position.x > Xmax THEN v.x = −10
IF b.position.y < Ymin THEN v.y = 10
    ELSE IF b.position.y > Ymax THEN v.y = −10
IF b.position.z < Zmin THEN v.z = 10
    ELSE IF b.position.z > Zmax THEN v.z = −10
RETURN v
```

Here of course the value 10 is an arbitrary amount to encourage them to drive in a particular direction.

During the course of flock control, one may want to break up the flock for various reasons. For example the introduction of a predator may cause the flock to scatter in all directions. The predator can be an object on an impending collision course with the flock. Scattering the flock can be done. Here the flock can disperse; they are not necessarily moving away from any particular object, but to break the cohesion (for example, the flock encounters a dangerously driven vehicle). Thus the system negates part of the influence of the vehicles rules.

```
PROCEDURE move_all_vehicles_to_new_positions( )
    FOR EACH VEHICLE b
        v1=m1*rule1(b)
        v2=m2*rule2(b)
        v3=m3*rule3(b)
        b.velocity=b.velocity+v1+v2+v3+
        b.position=b.position+b.velocity
```

When the risk of collision arises, the process can make m1 negative to scatter the flock. Setting m1 to a positive value again will cause the flock to spontaneously re-form.

Tendency away from a particular place is handled next. If the flock is to continue the flocking behavior but to move away from a particular place or object (such as a vehicle that appears to collide with the flock), then we need to move each vehicle individually away from that point. The calculation required is identical to that of moving towards a particular place, implemented above as tend_to_place; all that is required is a negative multiplier: v=−m*tend_to_place(b).

The vehicles can be organized into a V formation (sometimes called a skein) is the symmetric V-shaped formation for Drag Reduction and Fuel Saving where all the cars except the first drive in the upwash from the wingtip vortices of the vehicle ahead. The upwash assists each vehicle in supporting its own weight in flight, in the same way a glider can climb or maintain height indefinitely in rising air.

The leading motor vehicle of the flock is established as the target motor vehicle by the motor vehicles of the flock. The target motor vehicle may be established before the motor vehicle start running in flock. In another embodiment, the first motor vehicle of the flock detects a preceding motor vehicle with the information from the radar or the CCD camera on the leading motor vehicle or flock leader, and automatically establishes the detected preceding motor vehicle as a new target motor vehicle. By successively changing new target motor vehicles in this manner, new motor vehicles may automatically be added to the flock. Even if a motor vehicle is incapable of communication between motor vehicles, that motor vehicle may be established as a target motor vehicle according to an algorithm described later on.

In one embodiment, the leading motor vehicle of the flock establishes a hypothetical target motor vehicle, and transmits items of information of the hypothetical target motor vehicle to the other motor vehicles of the flock which follow the flock leader through the inter-vehicular communications such as DSRC.

Each vehicle in the flock is responsible for generating a speed plan which governs the relationship between the position in which the motor vehicle runs and the speed at which the motor vehicle runs. The vehicles perform determining, based on the speed plan, a planned position to be reached from the present position of the motor vehicle after a predetermined time t, e.g., 1.5 seconds, and a planned speed of the motor vehicle at the planned position in the flock. According to this function, if the speed plan from the present position of the motor vehicle is generated such that the motor vehicle is to maintain the speed of 80 km/h, i.e., 22.2 m/sec., then the planned position to be reached after the predetermined time t, e.g., 1.5 seconds, is 33.3 m spaced from the present position down the running path B, and the planned speed at the planned position to be reached is 80 km/h.

The function as the predicted value calculating means serves to determine a predicted position and a predicted speed to be reached by the motor vehicle after the predetermined time t. The predicted position is calculated from the present position, i.e., the traveled distance, the present speed, and the present acceleration of the motor vehicle which are given from the communication module 1, and the predicted speed is calculated from the present speed and the present acceleration of the motor vehicle.

The speed/acceleration of the vehicle, based on which the predicted position and the predicted speed will be determined, is basically determined from the speedometer. The predicted position and the predicted speed are determined using the speed and the acceleration of the motor vehicle and GPS position.

A distance deviation, i.e., a position error, between a planned position to be reached by the motor vehicle after the predetermined time t based on the speed plan and the predicted position, described above, to be reached by the motor vehicle, and a speed deviation, i.e., a speed error, between a planned speed to be reached by the motor vehicle after the predetermined time t based on the speed plan and the predicted speed, described above, to be reached by the motor vehicle are determined. These deviations are calculated by subtractions.

The target motor vehicle may be a flock leader. If, however, the target motor vehicle is not a flock leader, then the flock leader calculates a position, a speed, and an acceleration of the target motor vehicle using the laser radar, GPS, or triangulation of RF signals, for example.

Based on the above control algorithm, the engine throttle valve opening, the transmission, and the brake of each of plural following motor vehicles are controlled to control the motor vehicles in a flock.

The system detects the positional data of the preceding motor vehicle through inter-vehicular communications or the laser radar, and controls the following motor vehicle in the event that the preceding motor vehicle drops out of a normal control range of the vehicle flock control. Even when a motor vehicle drops out of the normal range of the vehicle flock control, the control algorithm controls a following motor vehicle to increase its inter-vehicular distance up to such a motor vehicle. Therefore, the vehicle platoon control will not be interrupted even when one or more motor vehicles drops out of the platoon.

If it is known that a group of motor vehicles will travel in platoon or motor vehicles are counted at a tollgate or the like and the incremental count is indicated to each motor vehicle to let it recognize its position in the platoon, then it is possible to establish the position i for each of the motor vehicles before they travel in platoon.

However, in order to handle a situation where another motor vehicle pulls in between motor vehicles running in platoon or another motor vehicle is added to a front or rear end of a platoon of motor vehicles, the process according to the present invention makes it possible for each of the motor vehicles running in flock to recognize its position relative to a target motor vehicle through inter-vehicular communications.

There are two procedures available for each of the motor vehicles running in flock to recognize its position relative to a target motor vehicle. The first procedure is applicable to local inter-vehicular communications by which each of the motor vehicles of the flock can communicate with only those motor vehicles which run immediately in front of and behind the motor vehicle. If the flock leader of a flock is selected as a target motor vehicle, then the target motor vehicle transmits its own positional information i=0 to a next motor vehicle which immediately follows the target motor vehicle. The following motor vehicle adds 1 to i, producing its own positional information i=1, recognizes that it is the second motor vehicle from the target motor vehicle, and transmits its own positional information i=1 to a next motor vehicle which immediately follows the second motor vehicle. Having received the positional information i=1, the next immediately following motor vehicle adds 1 to i, producing its own positional information i=2, recognizes that it is the third motor vehicle from the target motor vehicle, and transmits its own positional information i=2 to a next motor vehicle which immediately follows the third motor vehicle. In this manner, each of the motor vehicles is able to recognize its position relative to the target motor vehicle with a means for counting its position and local inter-vehicular communications.

If a target motor vehicle is not the flock leader of a flock and the target motor vehicle and the flock leader cannot communicate with each other through inter-vehicular communications, then the flock leader sets its own positional information to i=1, and transmits the own positional information i=1 to a next motor vehicle which immediately follows the target motor vehicle.

According to the present invention, as described above, a longitudinal acceleration correcting quantity of each of the motor vehicles of a flock is determined on the basis of predicted deviations of a position and a speed that are predicted after a predetermined time, from a speed plan, and the speed of the motor vehicle is controlled on the basis of the determined longitudinal acceleration correcting quantity. Therefore, the motor vehicles can smoothly be controlled to run in flock along a running path on a road.

A longitudinal acceleration correcting quantity of a motor vehicle following a target motor vehicle is determined on the basis of an inter-vehicular distance between the following motor vehicle and the target motor vehicle and a speed difference there-between after a predetermined time, and the speed of the following motor vehicle is controlled on the basis of the determined longitudinal acceleration correcting quantity. Consequently, the following motor vehicle can automatically be driven smoothly along a running path on a road while reliably keeping a proper inter-vehicular distance between the following motor vehicle and the target motor vehicle.

Since the system arrangements on a flock leader and a following motor vehicle of a flock are identical to each other, the flock leader and the following motor vehicle can automatically be driven in a manner to match them using slightly different software or program adaptations made therefor. Therefore, any one of the motor vehicles of the flock may become a flock reader or a following motor vehicle.

Each of following motor vehicles of a flock is not only controlled with respect to a flock leader, but also always monitors an inter-vehicular distance between itself and a preceding motor vehicle, so that it can increase the inter-vehicular distance even when a motor vehicle drops out of the flock. Therefore, it is not necessary to stop controlling the vehicle flock control when a motor vehicle drops out of the flock. Even when a motor vehicle drops out of a flock, the vehicle flock control system does not stop controlling the other motor vehicles to run in flock, and when the motor vehicle that has dropped out returns to the flock, the vehicle flock control system can continuously control the motor vehicles to run in flock. The vehicle flock control system allows different types of motor vehicles, such as trucks of different lengths, smaller automobiles, larger automobiles, etc., to be mixed in a flock, and can control those motor vehicles to run in flock. Accordingly, the vehicle flock control system according to the present invention is capable of stably controlling motor vehicles to run in flock on a road designed for motor vehicles to run automatically, and particularly of controlling the speeds of such motor vehicles smoothly.

Figures 1E, 1F:
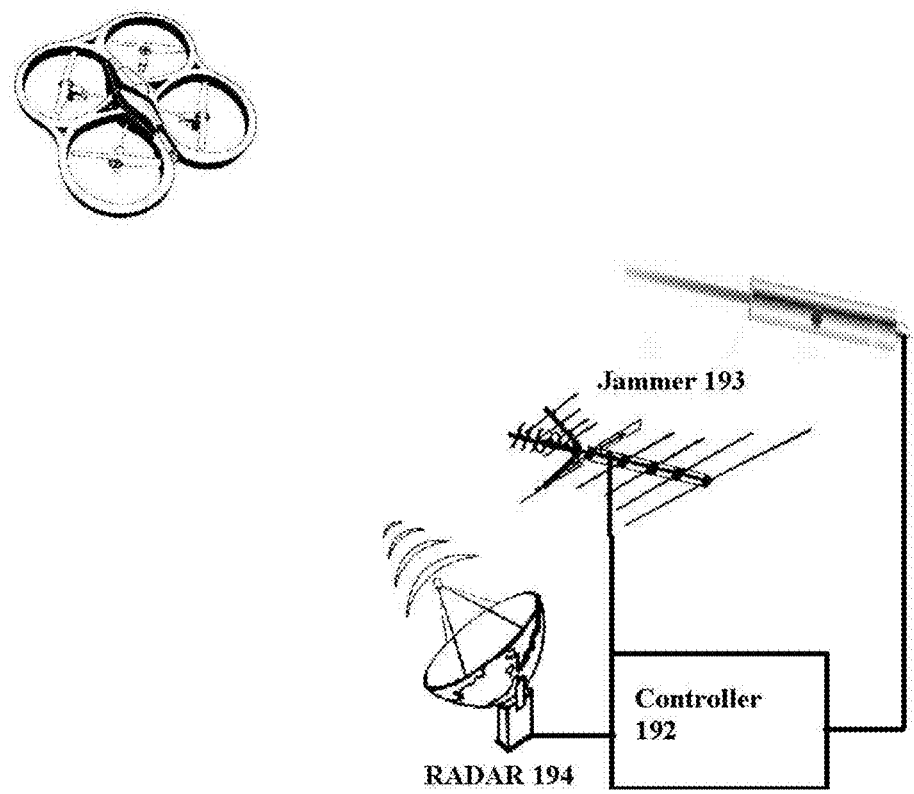
FIG. 1E shows an exemplary privacy control system.
FIG. 1F shows an exemplary process to manage drones that ignore the privacy indications set forth in the beacon transmission.

FIG. 1E shows an exemplary privacy control system. To enforce the privacy restrictions, the system can track incoming vehicles and determine if they are trespassing. This can be done using radar circuit 194, optical/sound recognition, or RF circuit identification. Upon confirmation of trespass, jammer 193 which can be laser/light based jamming can be turned on to prevent video recording. Jammer 193 can also be RF based to disorient the drone in this example.

One embodiment uses the NXP MR 2001 radar chip. The 77 GHz silicon germanium (SiGe) automotive radar solutions are based on multichannel receivers and transmitters that allow high-level integration and complex signal generation and processing suitable for detecting incoming vehicles such as smart cars or drones within a limited range. Once radar detects an approaching object inside of a predetermined boundary, a vision system is turned on to determine the type of vehicle.

One embodiment uses a sound-based classifier which compares the drone class, brand, make/model, etc. of the drone visual signature, or the sound signature with the lowest Wasserstein metric to the drone class, brand, make/model, etc. of the drone sound signatures with the next lowest metrics. Conditioned on the drone classes, make/models, brands matching, the classifier is configured to register a 'hit' classification for the feature frequency spectrum. The 'hit' classification includes, for example, a time of detection, the detected drone class, make/model, brand, etc., flight characteristic, and an identification of the feature frequency spectrum and the drone sound signatures used to make the classification. It should be appreciated that the classifier may use any algorithm to make the classification including, for example, a k-NN algorithm. The classifier is also configured to determine when the feature frequency spectrum does not correspond to a drone. For instance, the classifier may determine that a drone is not present if the drone class, make/model, brand, etc. does not match the specified next lowest number of Wasserstein metrics. Additionally or alternatively, the classifier may determine that a drone is not present if the lowest Wasserstein metric is above a threshold and/or if a specified number of the Wasserstein metrics are not below a threshold. The classifier may also be configured to determine a drone is present but may not be able to classify the drone. For example, less than the specified number of next lowest Wasserstein metrics may match the drone class, make/model, brand of the drone corresponding to the lowest Wasserstein metric. This may be enough information for the classifier to alert a user that a drone is present. However, the classifier 414 may provide an indication that the drone class, make/model, brand, etc. cannot be determined. Such a detection may be referred to as a 'partial-hit' classification.

One vision tracking embodiment uses Tracking-Learning-Detection (TLD), which is a real-time algorithm for tracking of unknown objects in video streams. The object of interest is defined by a bounding box in a single frame. TLD simultaneously tracks the object, learns its appearance and detects it whenever it appears in the video. The result is a real-time tracking that often improves over time. The output of the visual tracking can be provided to a 3 axis actuator to point a jammer to disable the drone.

The jammer can be a laser pointer that is aimed at the drone. Alternatively, a solar reflector can be used to disable the drone during day light. The jammer can simply be a bright beam of light that is aimed at the offending drone. The light or laser can be mounted on a tracking platform that follows the drone based on outputs from the radar tracker or the visual/audio tracker.

The jammer can be a pressure washer aimed at the drone. Pressure washers generally include a motor or engine that is operatively connected to a water pump. A high pressure hose connects a wand to a discharge side of the water pump. The wand commonly includes a pistol grip or the like that includes a trigger whose actuation effects discharge of a high-pressure water stream from the nozzle. Both the simplicity of operation and effectiveness associated with using such devices has made pressure washers a staple for various residential and commercial cleaning and surface preparation tasks. The range of use of such pressure washers can also be increased by providing various alternate nozzle assemblies in addition to providing a flow pressure adjustment mechanism for adjusting the pressure of the flow stream that is delivered to the nozzle supported by the wand. Commonly, a pressure unloader valve assembly is provided between the output of the pump and a high pressure hose that is connected to the wand. The pressure unloader valve assembly commonly includes an operator or a handle that is rotatably connected to a housing and interacts with a valve body that is disposed in the housing. The valve body is commonly manually movable to selectively cooperate with a valve seat to define a bypass flow passage. Manipulation of the valve body relative to the valve seat alters a pressure of the fluid flow that is communicated to the wand by opening and closing the bypass fluid passage.

The jammer can also be a water cannon. Water cannon differ from other similar devices in the volume of water delivered in a given time, the nozzle speed, the pressure that it is delivered at, and to a lesser extent the total volume that can be delivered. Pressure washers generally produce an extremely high pressure stream where the power of the stream drops off significantly over a very short distance. Ultra high pressure water jet cutters are used to cut a wide variety of materials including granite, concrete (see hydrodemolition), ceramics, fabric and even Kevlar can be used to disrupt the drone. One such cutter delivers 55,000 psi (380 MPa) through a nozzle 0.003 inch (8 micrometers) in diameter at 1 kilometer per second.

Another embodiment uses a powerful air cannon to disrupt or choke the air flow around it. Similarly, magnetic interference can be used to bring the drone to the magnetic gun. In another embodiment, a toy RC helicopter or another drone can be provided with an attachable line that locks to a target drone suitable for hand retrieval.

Electronically jamming the control and navigation signals is an effective way of disabling the drones—jammers work within a fixed range radius rather than having to be targeted and have the added benefit of being non-destructive—allowing the capture and re-use of the confused drone. Another embodiment saturates the bandwidth, you use an analog device with simple FM modulation. Eight 2.4 Ghz wireless video transmitters of sufficient power can be used. Alternately the system can provide interference across the entire 2.4 Ghz spectrum and put the drone in whatever fail-safe mode it has programmed in, which ranges from "return to home" to "crash" to "land."

GPS jammer can be used with a transmitter operating at the Global Positioning System (GPS/NAVSTAR) L1 frequency of 1575.42 MHz. The GPS band pass filter is a 2-pole Toko 4DFA-1575B-12 ceramic dielectric filter from Digi-Key[4], part number TKS2609CT-ND. This part is optional, but helps clean up the RF spectrum before further amplification. The filter's insertion loss is around 2 dB. The final RF amplifier is a WI Communications AH102. It provides another 13 dB of gain, with a higher P1 dB compression point of around +27 dBm.

A standard microwave oven could be focused using a parabolic dish to direct the beam on a single source capable of destroying and disrupting circuitry in cameras and motors.

In one embodiment, the system can build a database of commands by snooping the SPI port to discover and replicate the command protocol. In another embodiment, the system can broadcast the command to the drone for unencrypted drones. The more common ones (the DJI one in the linked paper and the FlySky protocol used by Turnigy, FlySky, etc. radios, the Spektrum (DSM2/DSMX) and the DJI protocol) are already reverse-engineered and the system can use a transmitter with higher power (since the "real" transmitter will try to channel hop to avoid the detected interference from the system).

The jammer can also be electromagnetic. One embodiment jams two bands: Band 1: 2.4 MHz—WIFI g/b/n: ≈2.4-2.5 GHz Band 2: 433 MHz ISM Band: 433.05-434.79 MHz. A voltage controlled oscillator is used to sweep the required band along with tuning circuit to drive the VCOs and a linear power amplifier is used to amplify the output power of the VCO Tuning circuit consists mainly of saw tooth generator to generate the tuning signal along with noise generator to tune the VCO to the required RF Jamming signal. The maximum power of ISM Bands allowed for civilian drone is 36 dBm EIRP (Effective Isotropic Radiated Power) with maximum transmitted power of 1 W (30 dBm) and the minimum Signal to Noise ratio SNR is 4 dB for data. Hence using a simple arithmetic; the radiated power of the RF Jammer must be more than 32 dBm EIRP, and two cascaded power amplifier with total gain of 30 dB is employed with 3 dBm VCO output power and 7 dBi Antenna; the radiated power of Band 1 RF circuit is 40 dBm which exceeds the required Jamming power required to block "band 1 (2.4 GHz)" civilian drone R/C communications. For Band 2 (433 MHz) RF Circuit; a high gain power amplifier is utilized with 35 dB typical gain and 2 dBi Antenna is employed radiating a total EIRP power of 37 dBm which is more than the required Jamming power required to Jamm "band 2 (433 MHz) civilian drone R/C communications. For Band 1 (2.4 GHz) Jammer RF circuit the Linear Power Amplifier can be RFMD RF2317 linear CATV amplifier and the Voltage Controlled Oscillator (VCO): CRYSTEKCVCO33BE-2400-2500 VCO which covers the frequencies from 2400 to 2500 MHz Voltage tuning input for the VCO is from 0 Vdc to 3 Vdc, output power of 3 dBm at 3 Vdc and output Impedance of 50 oh which is matched to the input impedance of the power amplifier. The antenna can be a 7 dbi 2.4 GHz Rubber Duck Antenna. For Band 2 (433 MHz) the Linear Power Amplifier can be the Skyworks SKY65116: 390-500 MHz power amplifier. With internal matching impedance to 50 ohms and the VCO can be the CRYSTEKCVCO33BE-2400-2500 VCO and the antenna can be a ¼ WAVE WHIP, SMA—right angle, 433 MHZ. A 555 Timer: can generate square want which will be converted to triangular wave to tune the VCO and a Zener Diode with power amp can be used to generate white noise signal.

FIG. 1F shows an exemplary process to manage drones that ignore the privacy indications set forth in the beacon transmission. If a non-compliant vehicle is found, the Identify drone and distance to property by audio-visual or RF identification (196)

If drone violates privacy, aim directional antenna at drone and deliver highly targeted beam to disable drone (196)

In one embodiment, a disabling device with a radio circuit configured to disrupt communication having a predetermined protocol can be used to take control of a movable device including a radio circuit to receive the communication. This can be done when radio circuit sends the protocol to disable the movable device. The disabling device forces the moveable device to be immobilized or to land. The disabling device can be a jammer. The disabling device projects a narrow RF beam to jam GPS and RF signals received by the vehicle. The disabling device can be a laser that blinds the camera on the moveable device. The laser can have sufficient energy to melt or degrade the optics and optical sensor array. If the moveable device uses GPS, the system includes jamming the GPS by focusing a beam of random GPS signal and localizing the beam to a predetermined radius around the moveable device. Mechanically control can be done with a plurality of drones, wherein the drones fly as a flock of birds to collide with the moveable device. The flock of birds carry a mesh or a chain to entangle the moveable device. A circuit can aim an electromagnetic beam at the moveable device to disable the device, such as an electromagnetic pulse (EMP) generator to aim an electromagnetic beam at the moveable device to disable the device. The electromagnetic beam can be aimed at the moveable device to disable the device.

In another embodiment, a method to provide privacy includes sending an electromagnetic pulse (EMP) at a moveable device; and causing the device to land or hover over a location over a period exceeding thirty minutes.

An electromagnetic pulse is a short burst of electromagnetic energy. Its short duration means that it will be spread over a range of frequencies. Pulses are typically characterized by:

The type of energy (radiated, electric, magnetic or conducted).

The range or spectrum of frequencies present.

Pulse waveform: shape, duration and amplitude.

The last two of these, the frequency spectrum and the pulse waveform, are interrelated via the Fourier transform and may be seen as two different ways of describing the same pulse. EMP energy may be transferred in any of four forms:

Electric field

Magnetic field

Electromagnetic radiation

Electrical conduction

A pulse of any one form of electromagnetic energy will always be accompanied by the other forms, however in a typical pulse one form will dominate.

In another embodiment, microwave beam can be used to shut down electronic systems (even those with traditional shielding against EMP) by bombarding the target with energy pulses between 300 and 300,000 megahertz. This amount of directed energy interferes with and overloads electronic circuits, causing them to shut down. The higher the energy produced by the system, the greater the disruption (and even physical damage for some very high-powered microwave beams) of the targeted electronic systems like engines and communications systems.

As will be discussed with respect to FIG. 2, a beacon frame may include various information usable by devices 11 such as prosperities of the access point 12, a timestamp indicative of the current time at the access point 12 when the beacon frame was transmitted, a beacon interval indicative of how frequently the access point 12 will broadcast beacon frames, etc. In one embodiment, access points 12 transmit beacon frames (as well as probe responses) in accordance with one or more IEEE 802.11 standards. Wireless devices 11 may use beacon frames to negotiate and establish a connection 10. In some embodiments, wireless devices 11 use beacon frames to facilitate roaming—e.g., a wireless device 11 may transition from one access point 12 to another access point 12 based on signals strengths of beacon frames, supported transmission rates specified in beacon frames, utilization of a given access point 12 as indicated in beacon frames, etc. In some embodiments, wireless devices 11 are further configured to use beacon frames to facilitate positioning of devices 11 within an area—e.g., a device 11 having a knowledge of where access points 12 are located may be configured to determine its location based on received signal strength indicators (RSSI) for beacon frames received from access points 12.

In various embodiments, wireless devices 11 are configured to determine an estimated time period during which devices 11 will receive a next beacon frame from a wireless access point 12, and to begin monitoring for the next beacon frame during the estimated time period. In one embodiment, the estimated time period is determined based on a timestamp and a beacon interval specified in either a probe response or a previously beacon frame according to the following formula.

$$TBTTN = (tlocal - tbeacon \bmod BI) + N \times BI$$

In this formula, the target beacon transmission time (TBTT) refers the estimated time period; tlocal refers the local time value at a device 11; tbeacon refers to the specified timestamp (corresponding to a local time value at the access point 12); BI refers to the specified beacon interval; and N is a positive integer representative of a next beacon frame (accordingly, to determine a respective estimated time period for a series of beacon frames, N may be 1 for an initial next beacon frame, 2 for the next beacon frame after the initial beacon frame, and so on). In such an embodiment, the estimated time period is determined relative to a clock of the wireless device 11. That is, a wireless device 11 and an access point 12 may each include a respective clock that maintains a local time value (such as clocks 352 and 532 discussed with respect to FIGS. 3 and 5, respectively). In some instances, the local time values maintained by these clocks may differ from one another. In such an embodiment, the estimated time period corresponds to a future time value of device 11's clock at which a beacon frame is expected to be received at the device 11. Determining the estimated time period in this manner stands in contrast to, for example, determining the estimated time period relative to the clock at the access point 12 as well as synchronizing the clock at the wireless device 11 with the clock at the access point 12 by replacing the time value of device 11's clock with the time value of a timestamp specified by a probe response or a beacon frame indicative the local time value at the access point 12.

By determining estimated time periods relative to a local clock of the wireless device 11 in some embodiments, the wireless device 11 is able to maintain an active connection with an access point 12 while determining estimated time periods for beacon frames of other access points 12, which may have different local times from one another and may broadcast beacon frames at different time periods and at different beacon intervals. For example, in one embodiment, upon establishing a wireless connection 10 with access point 12A, wireless device 11A may synchronize its clock with access point 12A's clock (e.g., using the timing synchronization function (TSF) specified by IEEE 802.11). Wireless device 11A may then determine estimated time periods for beacon frames from access points 12B and 12C, and may monitor for those beacon frames without synchronizing its clock with the clocks of those access points 12.

In some embodiments, an access point 12 may be configured to assist wireless devices 11 in determining estimated time periods by providing devices 11 with timing information about other access points 12. In one embodiment, this timing information may specify the local time values and beacon intervals of those access points 12. In another embodiment, this timing information may specify offset values indicative of a difference between that local time value at that access point 12 and the local time values of other access points 12. Accordingly, access point 12A may indicate, to wireless device 11A, the offset between its clock and the clocks of neighboring access points 12B and 12C. If the clocks of access points 12A and 12B differ by some amount (e.g., 5 ms) and device 11A has already determined an estimated time period for a next beacon frame from access point 12A, device 11A can then determine an estimated time period for a next beacon frame from access point 12B based on this offset (and without receiving a probe request or an initial beacon frame from access point 12B). In one embodiment, timing information may be transmitted as part of a beacon frame; in another embodiment, this timing information may be transmitted in one or more frames independently of beacon frames. In some embodiments, timing information may also be provided by other devices in network 100 such as other wireless devices 11.

In various embodiments, once a wireless device 11 has determined an estimated time period for an access point 12, the wireless device 11 is configured to begin monitoring a wireless channel within a window that starts before the estimated time period and continues after the estimated time period. For example, in one embodiment, a wireless device 11 may begin monitoring a channel 3 ms before the estimated time period and to continue monitoring for 3 ms after that period. If a beacon frame is detected, the device 11 may continue to monitor for the duration of the beacon frame transmission. On the other hand, if a beacon frame is not detected (e.g., after one or more failed attempts), in one embodiment, device 11 submits a probe request to receive a probe response and determines new estimated time period.

In some embodiments, while a wireless device 11 is waiting to monitor a wireless channel for a beacon frame, the wireless device 11 may perform various other operations such as communicating with another access point 12 or entering a low power state (a state in which it consumes less power than when monitoring a wireless channel).

Wireless devices 11 and access points 12 are discussed in further detail below with respect to FIGS. 3 and 5.

Turning now to FIG. 2, a block diagram of an exemplary beacon frame 200 is depicted. In the illustrated embodiment, beacon frame 200 includes a source address (SA) 210, destination address (DA) 215, basic service set identifier (BSSID) 220, timestamp 225, beacon interval 230, capability information 235, service set identifier (SSID) 240, supported rates 245, frequency hopping (FH) parameter set 250, and traffic indication map (TIM) 255. In some embodiments, beacon frame 200 may include more (or less) information than shown. (It is noted that probe responses may have a similar layout as beacon frame 200; however, a probe response may have a different destination address 215 as discussed below).

A beacon frame is approximately fifty bytes long, with about half of that being a common frame header and cyclic redundancy checking (CRC) field. As with other frames, the header includes source and destination MAC addresses as well as other information regarding the communications process. The destination address is always set to all ones, which is the broadcast Medium Access Control (MAC) address. This forces all other stations on the applicable channel to receive and process each beacon frame. The CRC field provides error detection capability. The beacon's frame body resides between the header and the CRC field and constitutes the other half of the beacon frame.

Source address 210, in one embodiment, is the address of the access point 12 that is sending beacon frame 200 (or probe response). In IEEE 802.11, address 210 is a media access control (MAC) address of the access point 12.

Destination address 215, in one embodiment, is an address of an intended recipient or recipients. In the case of a beacon frame broadcast, address 215 may be a broadcast address monitored by multiple wireless devices 11. In the case of a probe response, address 215 may be the address of the device 11 that sent the probe request.

BSSID 220, in one embodiment, is an identifier indicative of the basic service set with which the access point 12 is associated. In some instances, BSSID 220 is the same as source address 210.

Timestamp 225, in one embodiment, is a time value indicative of the current local time at an access point 12 when beacon frame 200 was transmitted. After receiving a beacon frame, a station uses the timestamp value to update its local clock. This process enables synchronization among all stations that are associated with the same access point.

Beacon interval 230, in one embodiment, is value indicative of how frequently a beacon frame 200 will be broadcast from an access point 12. This represents the amount of time between beacon transmissions. Before a station enters power save mode, the station needs the beacon interval to know when to wake up to receive the beacon (and learn whether there are buffered frames at the access point).

Capability information 235, in one embodiment, specifies various information about an access point 12 such as whether the access point is associated with ad-hoc infrastructure, supports encryption, supports usage of short preambles, etc. In one embodiment, the permission data is embedded in the capability information 235. For example, the permission data includes each property's precise longitude and latitude with permission options, such as options to allow a particular to access the property but not others. For example, the options can specify that a vehicle can access the front parking spot, but drones cannot fly over the house.

SSID 240, in one embodiment, is a character identifier indicative of the wireless network being hosted by the access point 12. SSID 240 may, for example, correspond to the name of a wireless network displayed on wireless device 11 to a user.

Supported rates 245, in one embodiment, specify the supported transmission rates of an access point 12. Each beacon carries information that describes the rates that the particular wireless LAN supports. The beacon includes information about the specific signaling methods (such as frequency hopping spread spectrum, direct sequence spread spectrum, etc.). For example, a beacon would include in the appropriate parameter set the channel number that an 802.11b access point is using. Likewise, a beacon belonging to frequency hopping network would indicate hopping pattern and dwell time. For example, a beacon may indicate that only 1, 2, and 5.5 Mbps data rates are available. For example, rates 245 may specify that an access point 12 supports transmissions rates at 11, 36, and 54 Mbit/s.

FH parameter set 250, in one embodiment, specifies information usable to facilitate frequency hopping. This information may include, for example, a dwell time for staying on a particular channel, an indication of the hop pattern, an index identifying the current point in the hop pattern.

TIM 255, in one embodiment, specifies information usable to by wireless devices 11 operating in a low power mode to determine whether an access point 12 has buffered frames for them while they were operating in the low power mode. An access point periodically sends the TIM within a beacon to identify which stations using power saving mode have data frames waiting for them in the access point's buffer. The TIM identifies a station by the association ID that the access point assigned during the association process.

One embodiment uses the 802.11 provision to carry nonstandard, vendor-specific information in a "vendor specific" Information Element (IE) field of the beacon frame. This IE (with ELEMENT ID 221) is provisioned to always be present as a last IE in the frame body of beacon. Using it, up to 253 octets of information can be embedded in each beacon frame. The privacy indication can be embedded in the IE field. Each IE contains three fields: 1 octet of ELEMENT ID field, followed by 1 octet of LENGTH field, followed by variable length element-specific INFORMATION field. Each IE is assigned a unique ELEMENT ID which fits in 1 octet. So 255 different ELEMENT IDs are possible. Out of these, 802.11 has reserved the unspecified IDs. The LENGTH field specifies the length of Element-specific INFORMATION field. The minimum and maximum value which the one-octet LENGTH field of each ELEMENT ID can take is fixed and known. It is this LENGTH field in which the data gets transmitted without any information. For example, Power Constraint Information Element (with Element ID 32) can have INFORMATION field of one octet only. So, the LENGTH field will always contain the value 1, thus leaving 7 most significant bits to contain value 0 always. If all the IE are part of the Beacon, the system can overload a total of 81 bits (approx 10 octets) of privacy indication information on it.

An 802.11 probe response frame is very similar to a beacon frame, except that probe responses don't carry the TIM info and are only sent in response to a probe request. A station may send a probe request frame to trigger a probe response when the station needs to obtain information from another station. A radio NIC, for instance, will broadcast a probe request when using active scanning to determine which access points are within range for possible association.

While providing privacy information as part of a wireless access point (WAP) has been detailed, a standalone privacy beacon transmitting over the ISM band can be used to indicate the NoAccessZone indication as well. In one embodiment, the user computer can add the coordinates to online, global database such as NoFlyZone. Each property's precise longitude and latitude—but not addresses or property owners' names—are shared with and accessible to, manufacturers of drones and drone operating systems to prevent flight by coding in a geofence.

Figure 3:
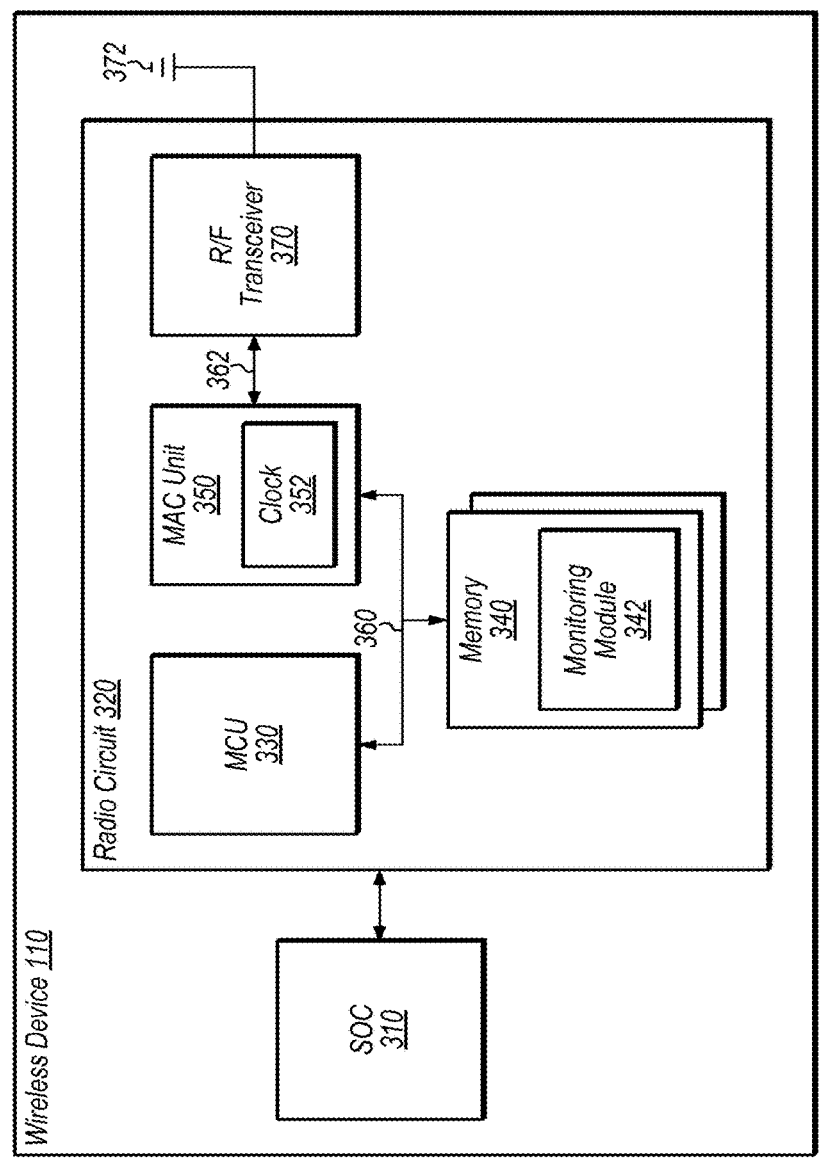
FIG. 3 is a block diagram illustrating one embodiment of a wireless device.

Turning now to FIG. 3, a block diagram of a wireless device 11 is depicted. In the illustrated embodiment, wireless device 11 includes a system on a chip (SOC) 310 and a radio circuit 320. Radio circuit 320, in turn, includes a microcontroller unit (MCU) 330, memory 340, MAC unit 350, interconnects 360 and 362, and an R/F transceiver 370. In some embodiments, device 11 may be configured differently than shown—e.g., device 11 may include a processor and memory rather than SOC 310; radio circuit 320 may include dedicated logic rather than monitoring module 342 discussed below.

SOC 310, in one embodiment, is configured manage operation of wireless device 11. SOC 310 may include a central processor unit (CPU) and memory storing various applications executable by the CPU (one embodiment of SOC 310 is discussed below with respect to FIG. 7). SOC 310 may generate data being transmitted from wireless device 11 as well as operate on data received at wireless device 11.

Radio circuit 320, in one embodiment, is configured to coordinate wireless communication for wireless device 11. In the illustrated embodiment, MCU 330 executes program instructions stored in memory 340 (such as monitoring module 342) to manage operation of radio circuit 320. In one embodiment, MAC unit 350 facilitates frame assembly and disassembly for transceiver 370. Transceiver 370, in turn, may generate RF signals for outbound frames transmitted via antenna 372 and process RF signals for inbound frames received via antenna 372.

Monitoring module 342, in one embodiment, includes program instructions executable to cause radio circuit to monitor for beacon frames. Accordingly, module 342 may include instructions executable to determine estimated time periods for when beacon frames will be received and to cause radio circuit to monitor particular wireless channels for beacon frames during those time periods such as described above. In some embodiments, a processor other than MCU 330 (such as a processor within SOC 310) may execute monitoring module 342; functionality of module 342 may also be implemented in hardware.

Clock 352, in one embodiment, is configured to maintain a local time value for wireless device 11. Accordingly, clock 352 may store a value that is updated periodically to reflect the current time. In some embodiments, clock 352 maintains a 64-bit value that is incremented every microsecond (e.g., in accordance with IEEE 802.11); however, in other embodiments, clock 352 may maintain a different size value that is updated at a different rate. In one embodiment, MAC unit 350 appends the current local time value maintained by clock 352 to received beacon frames to indicate when those frames were received at radio circuit 320. In one embodiment, monitoring module 342 uses this local time value along with a timestamp and a beacon interval to determine an estimated time period for receiving a next beacon frame (accordingly, the time value of clock 352 may correspond to tlocal in the formula discussed above). In some embodiments, clock 352 may be located independently of MAC unit 350 (and even externally to radio circuit 320).

Figure 4:
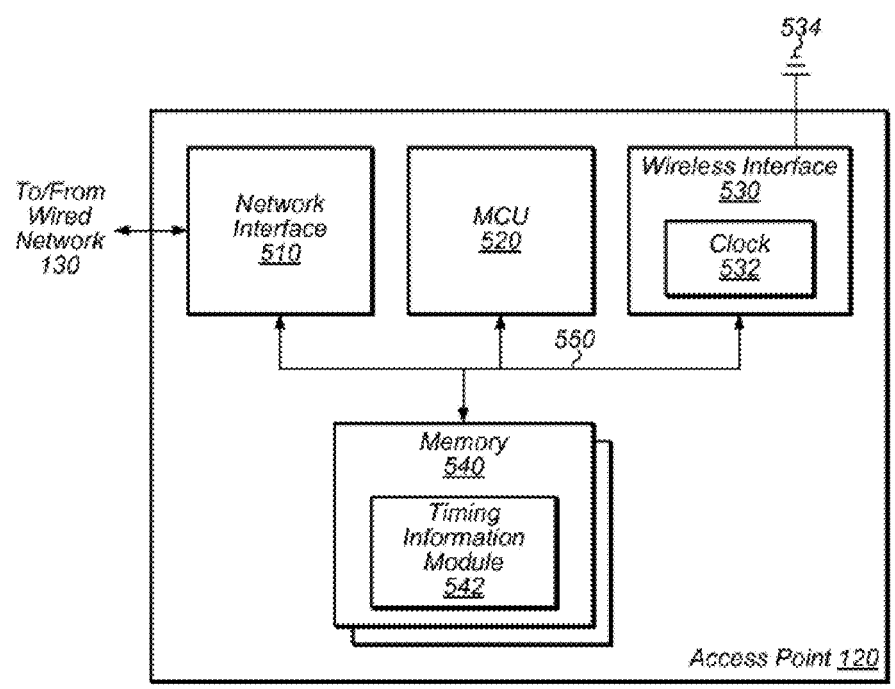
FIG. 4 is a block diagram illustrating one embodiment of an access point.

Turning now to FIG. 4, a block diagram of an access point 12 is depicted. In the illustrated embodiment, access point 12 includes a network interface 510 configured to interface access point 12 with wired network 13, an MCU 520 configured to manage operation of access point, a wireless interface 530 configured to communicate with wireless devices 11 via an antenna 534, memory 540, and an interconnect 550. Wireless interface 530 further includes a clock 532 (in other embodiments, clock 532 may be located elsewhere).

Clock 532, in one embodiment, is configured to maintain a local time value for access point 12. In various embodiments, clock 532 is used to generate the timestamp included beacon frames and probe responses transmitted by access point 12. Clock 532 may be implemented in a similar manner as clock 352 discussed above with respect to FIG. 3.

As discussed above, in some embodiments, access point 12 is configured to provide timing information about other access points 12 to wireless devices 11. In the illustrated embodiment, MCU 520 executes program instructions of timing information module 542 to facilitate providing this information. Accordingly, module 542 may be executable to cause the access point 12 to receive time values from clocks 532 located in other access points 12 and to communicate, via the wireless interface 530, timing information corresponding to the time values. In one embodiment, access point 12 receives timing values from other access points 12 via network interface 510. Alternatively, access point 12 may also receive time values via wireless interface 530. In one embodiment, the communicated timing information specifies these received time values. In another embodiment, module 542 is executable to determine, for each of the time values, a respective offset value indicative of a difference between that time value and the local time value of clock 352. The timing information may then specify these determined offset values. In some embodiments, access point 12 may communicate timing information within a beacon frame or a probe response. In other embodiments, the timing information may be communicated within one or more frames transmitted independently of beacon frames—accordingly, in one embodiment, such frames may be communicated less frequently than the periodic broadcast of beacon frames.

Figure 5:
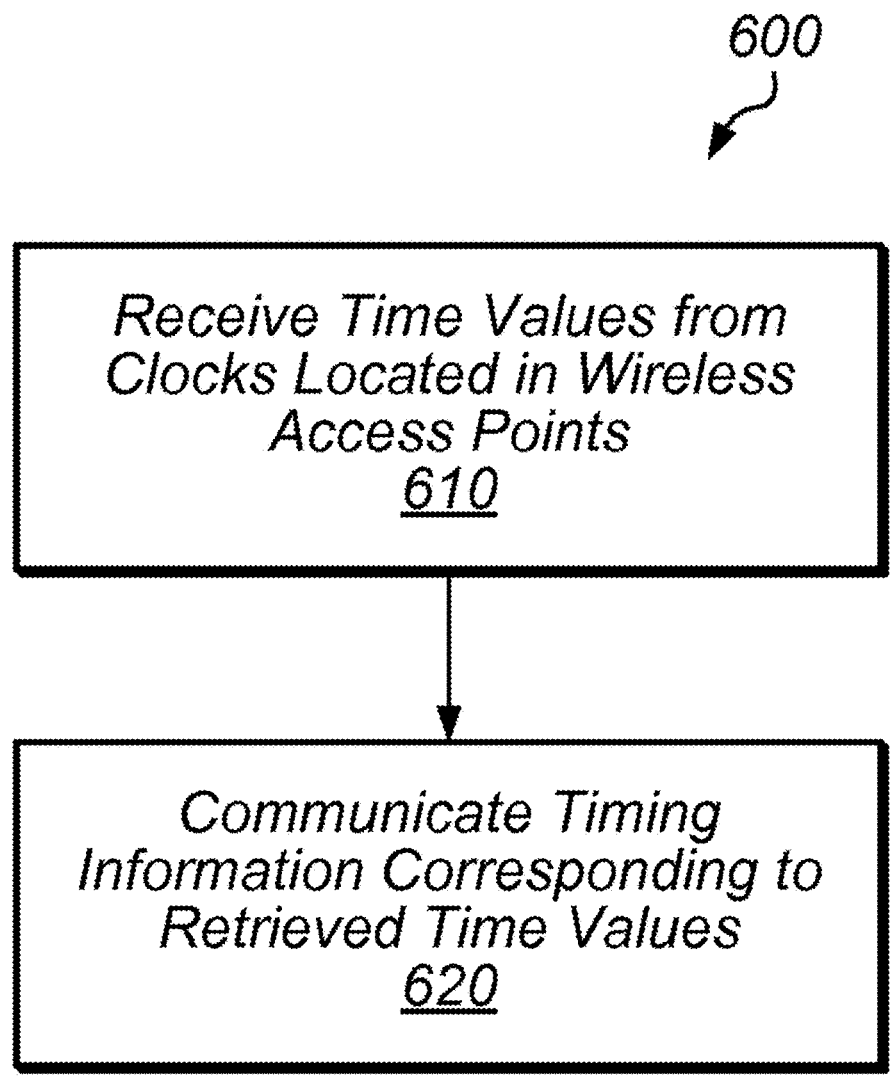
FIG. 5 is a flow diagram illustrating one embodiment of a method for providing timing information associated with neighboring access points.

Turning now to FIG. 5, a flow diagram of a method 600 for providing timing information associated with neighboring access points is depicted. In one embodiment, method 600 is performed by an access point such as access points 12. In another embodiment, method 600 may be performed by another wireless device such as devices 11. Method 600 begins, in step 610, with receiving time values from clocks located in different wireless access points such as described above. Method 600 continues, in step 620, with communicating, to a wireless device via a wireless interface, timing information corresponding to the time values such as described above.

In response to receiving the information communicated in step 620, a wireless device may perform a corresponding method based on the received information. In one embodiment, such a method may include receiving, from a first wireless access point, timing information indicative of a local time value for a second wireless access point. The method may further include determining, based on the timing information, an estimated time period during which the device will receive a next beacon frame from the second wireless access point.

Figure 6:
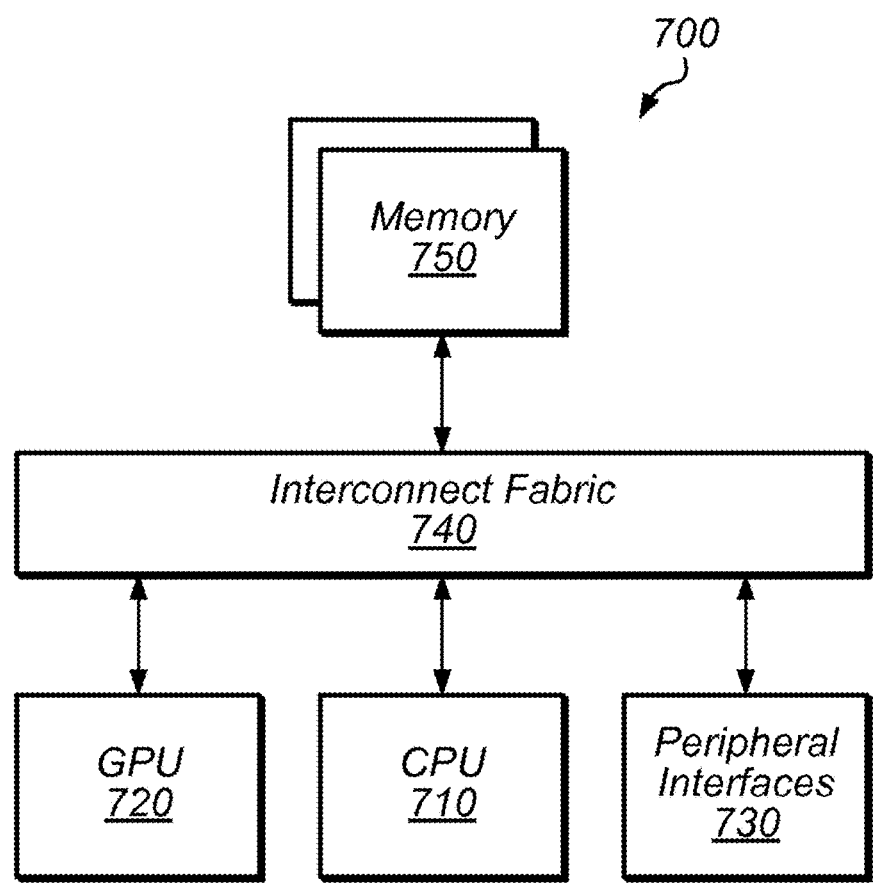
FIG. 6 is a block diagram illustrating one embodiment of an exemplary system on a chip.

Turning now to FIG. 6, a block diagram of an exemplary SOC 700 is depicted. SOC 700 is one embodiment of an SOC (which may correspond to SOC 310 described above). In the illustrated embodiment, SOC 700 includes a central processor unit (CPU) 710, graphics processing unit (GPU) 720, peripheral interfaces 730, interconnect fabric 740, and memory 750.

CPU 710 may implement any instruction set architecture, and may be configured to execute instructions defined in that instruction set architecture. CPU 710 may employ any microarchitecture, including scalar, superscalar, pipelined, superpipelined, out of order, in order, speculative, non-speculative, etc., or combinations thereof. CPU 710 may include circuitry to implement microcoding techniques. CPU 710 may include one or more processing cores each configured to execute instructions. CPU 710 may include one or more levels of caches, which may employ any size and any configuration (set associative, direct mapped, etc.). In some embodiments, CPU 710 may execute instructions that facilitate performance of operation of wireless device 11 described above.

GPU 720 may include any suitable graphics processing circuitry. Generally, GPU 720 may be configured to render objects to be displayed into a frame buffer. GPU 1020 may include one or more graphics processors that may execute graphics software to perform a part or all of the graphics operation, and/or hardware acceleration of certain graphics operations. The amount of hardware acceleration and software implementation may vary from embodiment to embodiment.

Peripherals interfaces 730 may used to interface with various peripherals devices located within SOC 700 or external to SOC 700. These devices may include any desired circuitry, depending on the type of system including SOC 700. For example, in one embodiment, the peripheral devices may include devices for various types of wireless communication, such as WiFi, Bluetooth, cellular, global positioning system, etc. Peripheral devices may also include additional storage, including RAM storage, solid-state storage, or disk storage. Peripherals devices may include user interface devices such as a display screen, including touch display screens or multitouch display screens, keyboard or other input devices, microphones, speakers, cameras, scanners, printing devices, etc.

Interconnect fabric 740, in one embodiment, is configured to facilitate communications between units 710-750. Interconnect fabric 740 may include any suitable interconnect circuitry such as meshes, network on a chip fabrics, shared buses, point-to-point interconnects, etc.

Memory 750 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. In some embodiments, the modules may be mounted in a chip-on-chip configuration, a package-on-package configuration, or a multi-chip module configuration.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system to interrupt actions of a moveable device or a drone, comprising:
   a disabling device with a radio circuit configured to send a no-entry signal to the movable device or drone using a predetermined protocol; and
   if the moveable device or drone is non-responsive to the no-entry signal, the radio circuit sends the protocol to disable the movable device, wherein the moveable device radio circuit is configured to send a probe request to a wireless access point to initiate transmission of a probe response specifying a beacon privacy indication.

2. The system of claim 1, wherein the moveable device comprises a aircraft, a car, a delivery vehicle, a robot, or a moveable frame.

3. The system of claim 1, wherein the disabling device forces the moveable device to be immobilized or to land.

4. The system of claim 3, wherein the disabling device comprises a jammer.

5. The system of claim 3, wherein the disabling device projects a narrow RF beam to jam GPS and RF signals received by the vehicle.

6. The system of claim 3, wherein the disabling device comprises a laser.

7. The system of claim 1, wherein the disabling device is mounted on a tracker to follow the moveable device.

8. The system of claim 1, comprising a transmitter communicating plurality of access conditions, including type of vehicles and restriction on each type of vehicle.

9. The system of claim 1, comprising a beacon frame wherein the beacon frame specifies a plurality of access conditions, including predetermined vehicle IDs and restriction on each vehicle.

10. The system of claim 1, wherein the radio circuit is configured to receive an initial beacon frame specifying a beacon interval and a timestamp corresponding to a clock of the wireless access point, and wherein the radio circuit is configured to determine the estimated time period based on the beacon interval and the timestamp, and wherein the radio circuit is configured to enter a low power state before beginning the monitoring of the wireless channel for the next beacon frame.

11. The system of claim 1, comprising a microwave generator to aim microwave energy at the moveable device to disable the device.

12. The system of claim 1, wherein the radio circuit operates over an unlicensed spectrum.

13. The system of claim 1, wherein the moveable device uses GPS, comprising jamming the GPS by focusing a beam of random GPS signal and localizing the beam to a predetermined radius around the moveable device.

14. The system of claim 1, comprising a plurality of drones flying as a flock of birds to collide with the moveable device.

15. The system of claim 14, wherein the flock of birds are coupled to a mesh or a chain to entangle the moveable device.

16. The system of claim 1, comprising a circuit to aim an electromagnetic beam at the moveable device to disable the device.

17. The system of claim 1, comprising an electromagnetic pulse (EMP) generator to aim an electromagnetic beam at the moveable device to disable the device.

18. The system of claim 1, comprising a circuit to aim an electromagnetic beam at the moveable device to disable the device.

* * * * *